VICTOR R. HUEBNER
INVENTOR.

United States Patent Office 3,509,035
Patented Apr. 28, 1970

3,509,035
CONTINUOUS PARTICLE ELECTROPHORESIS CELL
Victor R. Huebner, Fullerton, Calif., assignor to Beckman Instruments, Inc., a corporation of California
Filed Apr. 14, 1967, Ser. No. 630,980
Int. Cl. B01k 5/00
U.S. Cl. 204—299
3 Claims

ABSTRACT OF THE DISCLOSURE

An improved continuous particle electrophoresis cell supported by a rigid backing member and having an electrophoresis space defined by a front plate, a rear plate and a shaped, non-deformable spacer in between the plates. The sample to be electrophoretically separated is injected into an electrolyte curtain flowing in the electrophoresis space. Electrophoretic separation is accomplished by a potential gradient applied across the curtain via electrode assemblies mounted in the rear plate, the front plate being mounted for quick removal.

---

This invention relates generally to continuous particle electrophoresis in which mixtures of small particles are separated by electrophoresis on a continuous flow basis.

In continuous particle electrophoresis, the sample to be separated is injected into a thin film or curtain of electrolyte which continuously flows in an electrophoresis space. A laterally oriented electrical field produces lateral migration of the individual particles within the sample. The amount of migration is dependent upon the surface characteristics of the particles and the operating conditions and serves to identify the various particle components of the sample.

In certain continuous particle electrophoresis cells of the prior art, the electrophoresis space is defined by a pair of spaced, parallel plates. The electrical potential gradient is applied to the lateral edges of the electrolyte curtain flowing in the electrophoresis space by means of electrode assemblies mounted along the sides of the plates. This construction makes disassembly and reassembly of the cell a cumbersome process and periodic cleaning of the cell is excessively time consuming. Further, the spacers defining the distance between the plates are usually made of a soft, easily deformable fibrous or rubber material. Consequently, the curtain thickness may neither be uniform over the length of the cell when the plates are clamped together nor the same after disassembly and reassembly of the cell. Reproducibility of results may thereby be impaired.

The novel features which are believed to be characteristic of the invention are set forth with particularity in the appended claims. The invention itself, however, together with the purposes, objects and advantages thereof, can best be understood by reference to the following description taken in connection with the accompanying drawings in which:

Figure 1:
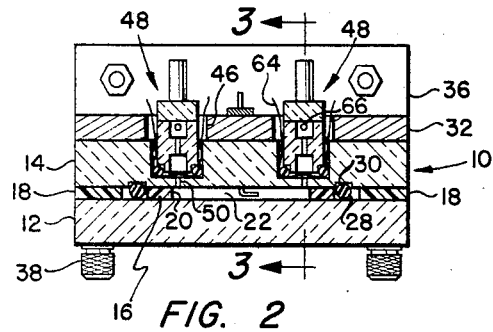
FIG. 1 is a front elevation view of an exemplary embodiment of a continuous particle electrophoresis cell in accordance with the present invention.
Figure 2:
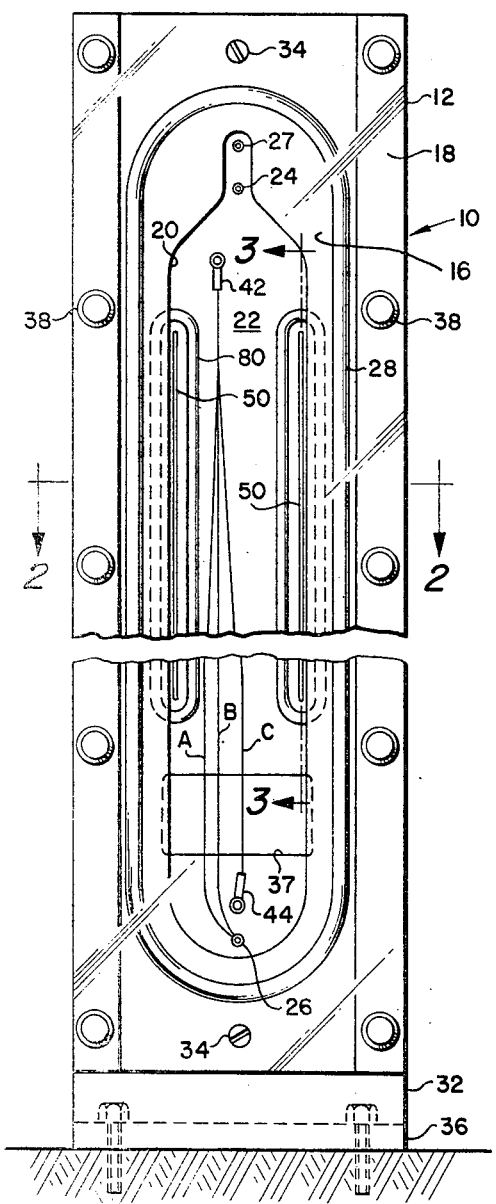
FIG. 2 is a sectional view taken along the plane 2—2 in FIG. 1.

Turning now to the drawings, an electrophoresis cell 10 is shown comprising basically a pair of flat, elongated plates 12 and 14 mounted in parallel, spaced-apart relation. The plates 12 and 14 may be fabricated from any rigid, non-conductive, preferably transparent material, for example, clear acrylic plastic such as that sold under the trademark "Lucite." Transparent plates permit both visual observation of the cell in operation and optical scanning of the electrophoresis pattern represented in FIG. 1, for example, by the bands A, B and C.

The spacing between the plates is determined by the thickness of an internal spacer 16 and a pair of external, auxiliary spacer members 18. Spacers 16 and 18 are made of a non-conductive, substantially non-deformable, chemical-resistant material such as the fluorocarbon plastic identified by the trademark "Teflon." By using relatively rigid spacers between the plates 12 and 14, curtain distortions, along the length of cell, are minimized and even after repeated disassembly and reassembly of the cell, curtain thickness will remain the same.

The internal spacer 16 is provided with an elongated opening 20 which, in conjunction with the plates 12 and 14, defines an elongated electrophoresis space 22. By introducing the curtain electrolyte near the upper end of the straight portion of the electrophoresis space, via an electrolyte supply tube 24, a laminar flow curtain, having uniform pressure and velocity distribution across its width, is formed in the parallel-sided portion of the electrophoresis space. The lower end of the space 22 has a semi-circular shape with a curtain removal tube 26 positioned near the lower extremity. In addition to the previously described tubes, an air release tube 27 is provided at the upper extremity of the space 22 to remove any bubbles introduced during operation.

Sealing of the electrophoresis space is accomplished by an O-ring 28 which lies adjacent the periphery of the spacer 16. A groove 30 is provided in the front surface of the rear plate 14 for retaining the O-ring 28.

To prevent bending of the cell 10 and consequently, distortion of the curtain, the cell is mounted on a rigid backing member 32 running the entire length of the cell. The rear plate 14 is securely attached to the backing member by means of screws 34, for example, which thread directly into the backing member. The lower end of the member 32 extends below the lower extremity of the cell and is provided with a flange 36 for mounting the cell in a vertical position on a suitable surface. An opening 37 is formed in the member 32 to permit the passage of a light beam for optical scanning.

The plates 12 and 14 are clamped together by a plurality of screw fasteners 38 which run along the lateral edges of the cell. The auxiliary spacers 18 prevent the plates from being drawn together at their edges which would affect the electrophoresis space thickness. The screws 38 may be threaded directly into the backing plate 32 and are provided with enlarged, knurled heads to facilitate their rapid removal.

The sample and curtain electrolyte flow systems may be similar to those disclosed in the copending application Ser. No. 591,733 of V. R. Huebner, filed Nov. 3, 1966 and assigned to the present assignee. Briefly, sample suspension from a reservoir (not shown) is introduced into the flowing electrolyte curtain through a sample injection tube 42. A laterally positionable tube 44 is provided within the lower portion of the electrophoresis space 22 which is adjustable to intercept any selected portion of the electrophoretic particle band pattern and deliver it to an external vessel. Typically, the sample injection tube 42 will be offset slightly to the left of center to more efficiently utilize the entire curtain width since nearly all particles have negative charges. For samples in which positive particles predominate, the electric field polarity can be reversed.

Figure 3:
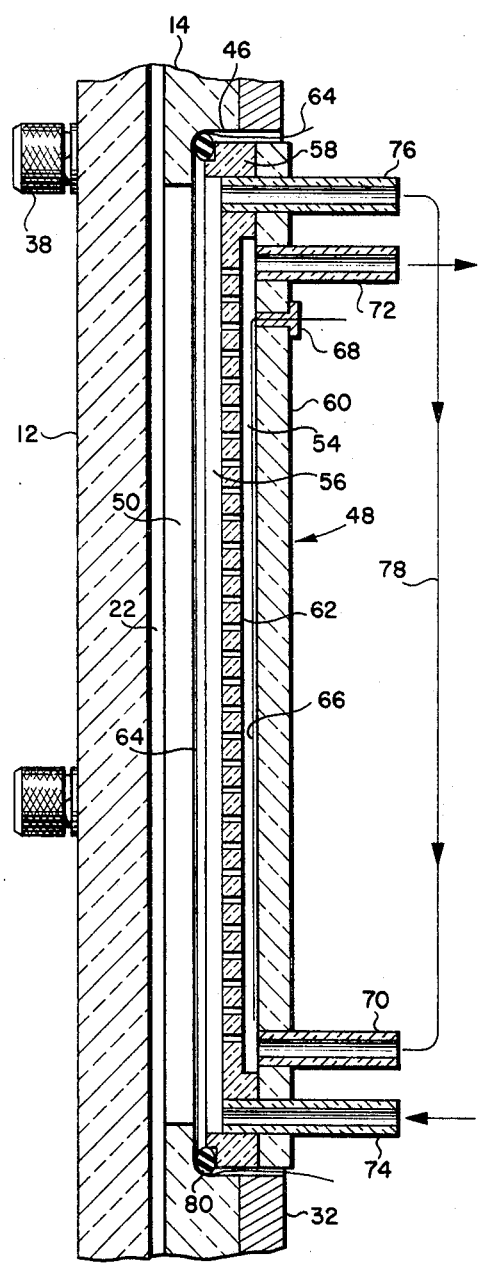
FIG. 3 is a sectional view, in elevation, of a portion of the cell of FIG. 1 taken along the plane 3—3.

Electrode means, best shown in FIG. 3, operatively associated with the electrophoresis space for applying a potential gradient across the curtain will now be described. The rear surface of the rear plate 14 is provided with a pair of elongated recesses 46 for receiving and retaining removable electrode assemblies 48. The recesses 46 communicate with the lateral edges of the electrophoresis space 22 through narrow slots 50 extending along a portion of the parallel section of the electrophoresis space 22.

The electrode assemblies 48 may be constructed in accordance with the disclosure of copending application Ser. No. 591,733, now Patent No. 3,458,428 referenced above. Generally, each assembly 48 comprises a housing defining an electrode channel 54 and a bridging channel 56. To facilitate manufacture, the housing may be built up from two pieces designated by the reference numerals 58 and 60. The electrode channel 54 is separated from the bridging channel 56 by a perforated partition 62. Each electrode assembly 48 further includes an ion-permeable membrane 64, which, when the electrode assembly is in place in the rear plate 14, will be sandwiched between the bridging channel 56 and the slot 50 thereby bringing the buffer solution flowing in the bridging channel 56 into ionically-conductive contact with the electrolyte in the slot 50 and the electrophoresis space 22. A wire electrode 66, of platinum or the like, supported by a fitting 68 in the housing element 60, is disposed in each electrode channel 54. A suitable source of D.C. power (not shown) is connected between the electrodes 66, whereby one electrode serves as the anode and the other as the cathode.

A preferred arrangement for flowing buffer solution in the channels 54 and 56 is described in detail in the copending patent application No. 591,733 referenced above. Briefly, each electrode channel 54 is provided with a buffer solution inlet port 70 near the lower end and an outlet port 72 near the top; similarly, each bridging channel 56 has a buffer inlet port 74 adjacent the lower extremity and a buffer outlet port 76 near the top. A bypass conduit, represented schematically by the line 78, connects the bridging channel outlet port 76 with the electrode channel inlet port 70. Buffer solution, introduced into the electrode assembly via the bridging channel inlet port 74 flows upward in the bridging channel 56, a portion exiting at the bridging channel outlet port 76 and the remainder passing through the perforated partition 62 to exit at the electrode channel outlet 72. The crossflow through the partition 62 prevents the migration of ions generated at the electrodes into the electrophoresis space. Uniform curtain pH is thereby maintained.

The electrode assemblies 48 are held in place in the recesses 46 by a suitable clamping means (not shown) which biases the assemblies against the rear plate. Sealing around each assembly is provided by an O-ring 80 retained in a peripheral step formed in the inside face of the housing element 58.

The positinoing of the electrode assemblies at the rear, rather than the side, of the electrophoresis curtain, in conjunction with the O-ring seals, produces a greatly simplified continuous particle electrophoresis cell. One advantage of this arrangement is that the electrode assemblies can be left in place during disassembly of the cell for cleaning. The construction of the present cell also permits rapid replacement of the front plate with modified front plates. For example, a sheet of glass over the inner surface of the front plate, in the area where optical scanning is to be performed, may be provided. The use of glass in the viewing area is helpful in obtaining a scratch-free transparent window for use with an optical scanner. Another modification may consist of a plurality of collection tubes carried by the front plate across the cell near the bottom of the electrophoresis space. The latter would permit preparative fractionation where it is desired to collect all components of the sample simultaneously. In a still further modification, a cooling front plate can be provided where high voltage gradients or a high conductivity buffer must be used.

A suitable cooling front plate can be constructed from an aluminum plate coated with a thin film of non-conductive material. The combination of the thin layer of non-conductive material on the metal plate provides excellent heat transfer characteristics when the metal plate is cooled by a liquid refrigerant. The result is highly effective temperature control of the curtain electrolyte.

It will be obvious to those skilled in the art that various modifications may be made to the specific exemplary embodiments of the invention described. While particular embodiments have been discussed, it will be understood that the invention is not limited thereto and that it is contemplated to cover in the appended claims any such modifications as fall within the true spirit and scope of the invention. For example, although the rear plate is preferred for mounting the electrode assembly, in some instances the front plate may be preferred, in which case the rear plate may be adapted for removal to periodically clean the cell.

What is claimed is:

1. In a continuous particle electrophoresis apparatus including a pair of plates, means for supporting the plates in spaced-apart, face-to-face, substantially parallel relationship, said means including a spacer having an opening therein sandwiched between the pair of plates, the spacer opening together with the plates defining an electrophoresis space through which an electrolyte freely flows as curtain, inlet and outlet means communicating with the electrophoresis space for conducting electrolyte to and from the space, inlet means communicating with the electrophoresis space for introducing into the flowing electrolyte curtain the sample to be electrophoretically separated into component bands, and means for removing the component bands from the electrophoresis space; the improvement comprising: first and second recesses formed in one of said plates and spaced apart a distance approximately equal to the width of the electrophoresis space for receiving electrode assemblies;

first and second slots formed in said one plate and disposed substantially parallel and adjacent to the lateral edges of said electrophoresis space for connecting the first and second recesses, respectively, to the electrophoresis space, and an electrode assembly positioned in each recess for applying an electrical potential gradient across said electrophoresis space, each electrode assembly comprising an ion permeable membrane having an inner and outer surface, the inner surface facing a slot formed in said one plate so as to come into contact with the electrolyte in the electrophoresis space via the slot, a housing abutting the outer surface of the membrane, the housing having an electrode channel and a bridging channel formed therein and including a perforated partition between said channels, the bridging channel interposed between the electrode channel and the outer surface of the membrane; an electrode disposed in the electrode channel for connection to a source of electrical power and inlet and outlet ports connected to both of the channels whereby buffer solution flows through said channels.

2. A continuous particle electrophoresis apparatus comprising:

a pair of plates supported in a spaced-apart, face-to-face, substantially parallel relationship;

a spacer fabricated from a rigid and non-deformable material and having an opening therein sandwiched between said plates, the opening in the spacer together with the plates on either side thereof defining an electrophoresis space through which an electrolyte freely flows as a curtain;

sealing means disposed about the outer edges of said spacer and between said plates to form a liquid tight seal for preventing leakage from said electrophoresis space;

electrolyte inlet and outlet means communicating with the electrophoresis space for introducing and withdrawing electrolyte from the space;

sample inlet means in communication with the electrophoresis space for introducing a sample to be electrophoretically separated into component bands in the electrolyte curtain;

sample outlet means for removing the sample component bands; and electrode means operatively associated with the electrophoresis space for applying an electrical potential gradient across the curtain.

3. Apparatus as defined in claim 2 wherein said electrode means comprises: first and second recesses formed in one of said plates, first and second electrode assemblies disposed in first and second recess, respectively, and first and second slots formed in said one plate for connecting the first and second recesses, respectively, in fluid communication with said electrophoresis space.

References Cited

UNITED STATES PATENTS

| 2,555,487 | 6/1951 | Haugaard et al. | 204—299 |
| 3,326,790 | 6/1967 | Bergraham | 204—299 |
| 3,412,007 | 11/1968 | Strickler | 204—180 |
| 3,412,008 | 11/1968 | Strickler | 204—299 |

JOHN H. MACK, Primary Examiner

A. C. PRESCOTT, Assistant Examiner

U.S. Cl. X.R.

204—180, 301